United States Patent [19]

Wilson

[11] Patent Number: 4,505,289

[45] Date of Patent: Mar. 19, 1985

[54] RUPTURE DISC APPARATUS

[75] Inventor: Bryce H. Wilson, Kansas City, Mo.

[73] Assignee: Continental Disc Corporation, Kansas City, Mo.

[21] Appl. No.: 478,861

[22] Filed: Mar. 25, 1983

[51] Int. Cl.³ .............................................. F16K 13/04
[52] U.S. Cl. .................................... 137/68 R; 137/315; 137/454.2; 251/148; 220/89 A
[58] Field of Search ................... 137/68 R, 315, 454.2, 137/454.4; 251/148, 172, 174; 220/89 A

[56] References Cited

U.S. PATENT DOCUMENTS

| 3,202,175 | 8/1965 | Dumm | 137/315 X |
| 3,442,288 | 5/1969 | Scaramucci | 137/454.2 X |
| 3,705,707 | 12/1972 | Scaramucci | 137/315 X |
| 4,083,376 | 4/1978 | Alaniz | 251/172 X |
| 4,403,626 | 9/1983 | Paul | 137/68 R |
| 4,431,022 | 2/1984 | Ripert | 137/454.2 X |

Primary Examiner—Harold W. Weakley
Attorney, Agent, or Firm—Litman, Day and McMahon

[57] ABSTRACT

A rupture disc apparatus comprises a rupture disc holding cartridge and a fixed receptacle for receiving the cartridge. The receptacle is positioned in a vent so as to communicate on opposite sides thereof with the vent. The cartridge is removable from and replaceable into the receptacle when no pressure exists within the vent so as to position the rupture disc to block passage of fluid through the vent when the disc is unruptured. A first of the receptacle or cartridge includes circumferential seating rings on opposite sides thereof and the other of the receptacle or cartridge includes seats for the rings. The seats and rings are positioned adjacent to the vent. The rings are urged into locking position in the seats by pressure from within the shaft and are manually removable when substantially atmospheric pressure exists within the vent.

6 Claims, 6 Drawing Figures

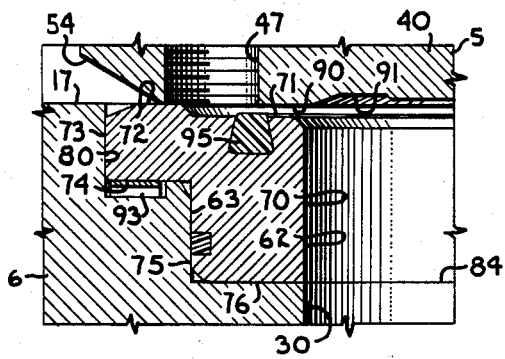
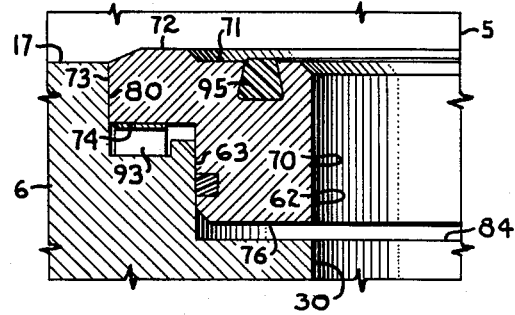
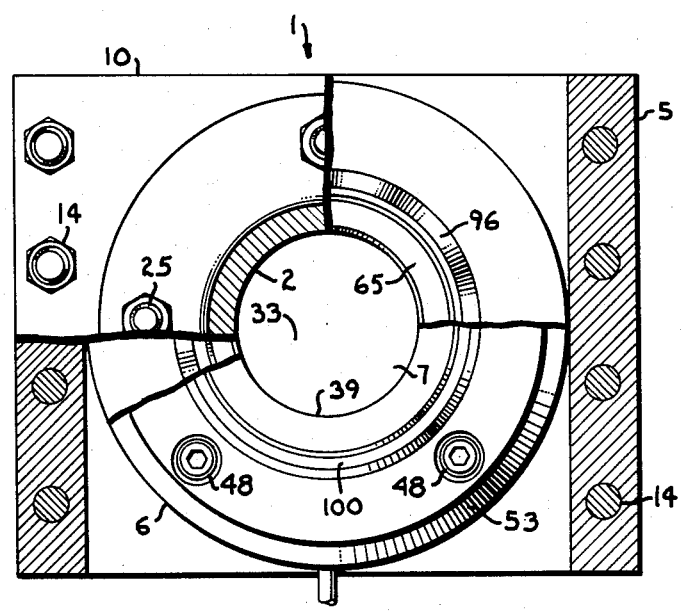
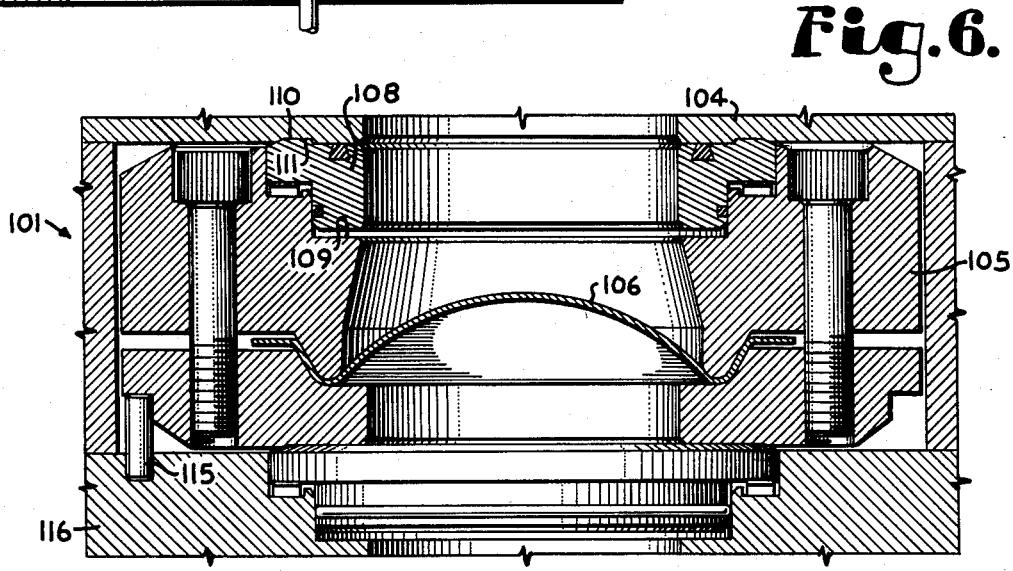

RUPTURE DISC APPARATUS

BACKGROUND OF THE INVENTION

The present invention relates to easily removable and replaceable rupture disc arrangements and, in particular, to such arrangements including a cartridge receiving receptacle communicating on each side thereof with a vent and a rupture disc holding cartridge which is inserted into the receptacle and locked therein by a system of seating rings and seats such that the cartridge cannot be easily removed from the receptacle when the vent is pressurized.

Rupture discs have been utilized for many years as a relatively simple device for providing relief of excessive pressure from a chemical processing vessel or the like. Rupture discs are typically much simpler than alternative devices such as relief valves and, therefore, are less subject to failure for such reasons as corrosion or the like. Unfortunately, once the rupture disc has relieved pressure and thereby accomplished the work for which it was intended, the disc is then broken and must be replaced in order to again block flow of fluid through a vent which is not overpressurized. Therefore, rupture discs have a disadvantage in not being able to be reusable as are more expensive and less reliable alternative devices such as relief valves.

Most of the rupture discs utilized in vent pipes to relieve overpressure are held in a two-part cylindrical device which is bolted between standard pipe flanges. In such an arrangement bolts typically extend circumferentially about the disc holding device and prevent its removal while holding the flanges securely together under tension. When replacement of the rupture disc is necessary, at least some of the bolts must be removed and the remaining bolts loosened after which the flanges are biased apart so that the disc holding device can be removed and the disc replaced after which the reverse procedure is followed. This procedure is cumbersome and time consuming and often requires the services of more than one technical tradesman. In addition, it is very easy for a tradesman to open a vent line which is still dangerously pressurized while removing the rupture disc in this manner and thereby expose the tradesman or those about him to serious injury.

The present invention is directed to a device which allows quick removal of a cartridge containing a rupture disc from a vent system when there is relatively little pressure within the vent, yet the cartridge is locked in place relative to the vent when there is substantial pressure therein so as to prevent removal when the vent is dangerously pressurized. This is especially important in situations where the fluid within the vent is corrosive and/or toxic.

It is further desired for the cartridge to have certain features associated therewith. In particular, it is desired that as little surface area as possible between the cartridge and the sealing surface against which the cartridge mates is exposed to fluid from within the pipe or vent so as to prevent damage by corrosive atmosphere within the vent. This is especially true where there are springs involved in the mechanism and/or the surfaces must easily and readily move relative to one another. This allows the use of rather common materials in the majority of the apparatus rather than exotic materials which would be required for those portions of the device which must be exposed to corrosive atmosphere.

Another concern is that the device be relatively inexpensive and that spare rupture disc cartridges also be inexpensive. It is, therefore, desired that the cartridge be of a rather simple manufacture and that the majority of the working or moving parts be positioned to remain within the receptacle when the cartridge is changed and are then readily available for use with another cartridge if so desired. This obviously requires that cartridges be easily interchangeable and that the cartridges be designed so that they cannot be placed improperly within the receptacle.

As was mentioned before, it is desired that as few tradesmen be required to replace the cartridge as possible and that placement of the cartridge within the receptacle be relatively simple. It is especally desired that the cartridge be relatively easily started within the receptacle so that the majority of the cartridge can be supported by the receptacle during the remainder of the installation. It is also a further advantage to be able to install a cartridge wherein the bursting information tag associated with the rupture disc can be physically attached to the disc and still extend outwardly from the cartridge and the holder so as to be seen by an inspector.

It is also desired that the mechanism utilized for locking the cartridge within the vent during periods of relatively high pressure be designed so that liquid readily drains therefrom when the liquid level is lowered in the vent. In this manner the liquid is not as likely to corrode the locking device or solidify therein so as to hamper easy removal of the cartridge from the receptacle.

OBJECTS OF THE INVENTION

Therefore, the objects of the present invention are: to provide a rupture disc arrangement wherein a rupture disc holding cartridge is received within a receptacle positioned within a vent; to provide such an arrangement wherein the cartridge requires no bolts spanning between opposite sides of the cartridge to retain the cartridge in position within the vent; to provide such an arrangement wherein a locking ring is positioned on either the cartridge or the receptacle and is biased by pressure within the vent to seat within a groove or seat on the opposite of the receptacle or cartridge by pressure within the vent thereby locking the cartridge within the receptacle; to provide such an arrangement having a locking ring which is positioned adjacent the vent; to provide such an arrangement wherein the sealing or locking ring is positioned within a socket which easily drains into the vent to prevent liquid buildup therein; to provide a cartridge which is easy to install within the receptacle and is especially easy to initially start or originally place within the receptacle; to provide such an arrangement wherein the cartridge is relatively simple to replace and such replacement is not relatively labor intensive; and to provide such an arrangement which is relatively easy to install, inexpensive to manufacture, and particularly well adapted for the intended usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A rupture disc arrangement is disclosed herein which comprises a rupture disc holding cartridge and a cartridge receiving receptacle. The receptacle is positioned within a vent so as to be connected with the vent on opposite sides thereof and to allow the cartridge to be easily placed therein without disassembly of the receptacle. When the cartridge is placed within the receptacle, the unbroken rupture disc is positioned in such a manner as to prevent passage of fluid through the vent or through an interior passage in the cartridge.

The cartridge is retained within the receptacle by a locking means which utilizes pressure from within the vent to maintain the cartridge within the receptacle against manual force trying to remove the cartridge therefrom. Preferably, the locking means comprises a ring which is held within a socket in either the cartridge or the receptacle and which is received in a seating groove or seat on the opposite of the cartridge or receptacle. Seals are utilized on both sides of the cartridge to prevent passage of fluid between the cartridge and the receptacle. Preferably there is a locking ring on the sides of the cartridge and the seals are maintained on the locking ring such that the locking ring also functions as sealing means. It is foreseen that the seals could be separate from the locking ring and/or that the locking means could have a configuration other than a ring, for example a tab or linear section would be suitable as long as suitable seals are provided between the cartridge and the receptacle.

Also preferably, the locking ring has a seat mating surface which is positioned in facing relationship opposite the seat when the cartridge is positioned within the receptacle. The locking ring has associated therewith a spring or biasing means which urges against a surface of the ring opposite the seating surface so as to continuously apply a relatively small amount of pressure thereto and to urge the seating surface into contact with the seat, thereby also sealing between the cartridge and the receptacle at relatively low pressure. The ring also includes two seals which are positioned so as to prevent passage of fluid about the ring between the cartridge and the receptacle. One of the seals is on the face of the ring opposite the vent which engages a corresponding side of the ring receiving socket. A second of the seals is positioned to sealably engage against either the cartridge or the receptacle opposite the socket but is spaced from the seat engaging surface and positioned at a place along the ring which has a lower profile than the seat engaging surface. In this manner, the seal does not scrape or grate against a surface when the cartridge is being inserted into the receptacle but rather is held away from the surface until the seat engaging surface engages with the seat.

The seating ring is positioned in close proximity to the vent and preferably it is directly adjacent the vent. In this manner, the surfaces of the receptacle, cartridge and ring which are wetted by fluid within the vent are generally only those surfaces of each which directly face a vent, the surface of the socket and ring to which pressure is applied by fluid in the vent and those other surfaces associated with the ring, cartridge and receptacle which approach the seals from the vent side. Preferably, the seal associated with the surface opposite the vent is radially inward of the biasing means, preferably a wave spring, such that the spring is not normally wetted by fluid within the vent.

The socket for the ring is, like the ring, preferably positioned adjacent the vent. In this manner the vent functions as the radially inward side of the socket such that fluid, which accumulates within the socket when the vent is full of such fluid, can easily drain therefrom when the vent is emptied of the fluid.

The drawings constitute a part of this specification and include exemplary embodiments of the present invention and illustrate various objects and features thereof.

BRIEF DESCRIPTION OF THE DRAWINGS

FIG. 3 is an enlarged and partial cross-sectional view similar to FIG. 2 showing an intermediate position of the cartridge during placement of the cartridge within the receptacle and, in particular, showing a locking ring prior to seating of the locking ring within a seat.

FIG. 4 is an enlarged and partial cross-sectional view similar to FIG. 3 showing the cartridge positioned within the receptacle and, in particular, showing the locking ring seated within the seat.

FIG. 5 is an enlarged top plan view of the rupture disc arrangement having various levels broken away to show detail thereof.

FIG. 6 is a partial and cross-sectional view of a modified embodiment of the rupture disc arrangement comprising a cartridge and receptacle and, in particular showing a locking ring positioned within a socket in the cartridge and having a seat for the locking ring and the receptacle.

DESCRIPTION OF THE INVENTION

Figure 1:
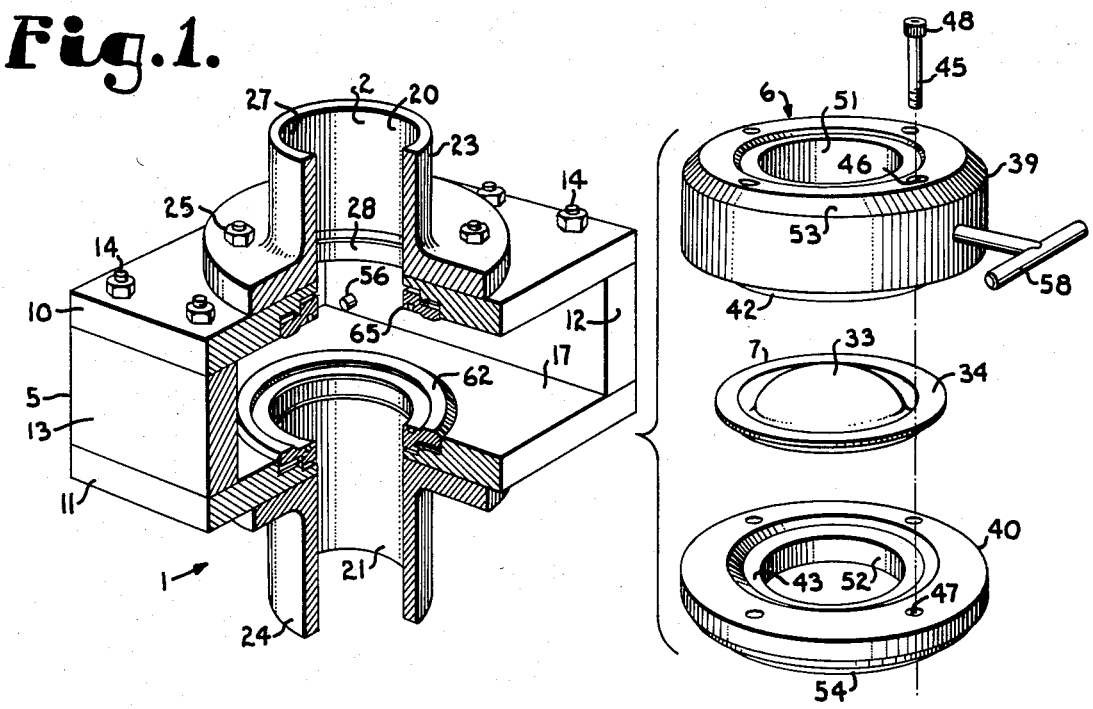
FIG. 1 is a perspective and exploded view of a rupture disc arrangement according to the present invention showing a receptacle connected to a vent on either side thereof and a cartridge holding a rupture disc which is received within the receptacle, portions of which are broken away to show detail thereof.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

With reference to the embodiment shown in FIGS. 1 through 5, the reference numeral 1 generally represents a rupture disc arrangement according to the present invention connected to a pressure relief vent 2. The rupture disc arrangement 1 comprises a receptacle 5, a cartridge 6 and a rupture disc 7. When fully assembled with the rupture disc 7 in an operational mode, the cartridge 6 is centrally received within the receptacle 5 and the rupture disc 7 is held by the cartridge 6 so as to block flow of fluid through the vent 2. When in the receptacle 5, an interior passageway 8 of the cartridge 6 is generally coaxial with the vent 2 but normally blocked by the rupture disc 7.

Figure 2:
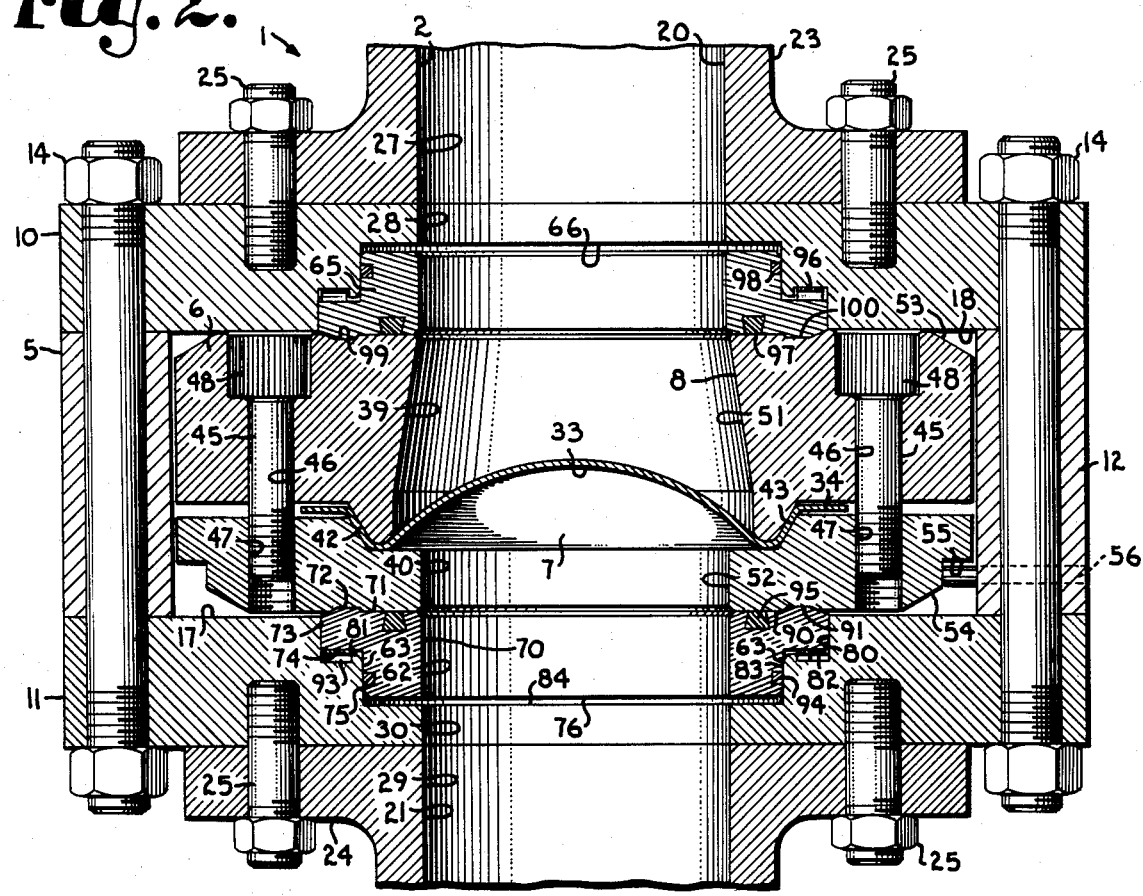
FIG. 2 is an enlarged and vertical cross-sectional view of the rupture disc arrangement showing the cartridge positioned within the receptacle.

For ease of description, the terms upper and lower, as used herein, refer to the alignment of the arrangement 1 as seen in FIG. 2, although such terms are not meant to be limiting.

The receptacle 5 is a box-like structure with opposed open ends and having an upper wall 10 and a lower wall 11 fixedly spaced by a pair of opposed side walls 12 and 13 held in position by a plurality of bolts 14. The upper wall 10 is spaced from the lower wall so that inner surfaces 17 and 18 respectively are generally parallel.

The vent 2 is effectively bisected by the receptacle 5 and the surfaces 17 and 18 are aligned approximately perpendicularly to an axis associated with the vent 2. The vent has an upper section 20 and a lower section 21 which are associated with opposite sides of the receptacle 5. A flange 23 connects the upper vent section 20 to the receptacle upper wall 10 and a flange 24 connects the lower vent section 21 to the receptacle lower wall 11 by means of suitable studs 25, welding, or the like. In this manner an interior 27 of the vent upper section 20 coaxially communicates with an aperture 28 in the receptacle upper wall 10. Likewise, an interior 29 of the vent lower section communicates with an aperture 30 in the receptacle lower wall 11. Although all of the flanges 23 and 24 are shown as a separate construction from the receptacle upper wall and lower wall 10 and 11 respectfully, it is foreseen that the vent sections and respective walls can be of unitary construction spaced by suitable fixed means allowing the insertion of the cartridge 6 into the receptacle 5.

The rupture disc 7 is of a conventional construction having a rupturable dome 33 and associated circumferential skirt 34.

The cartridge 6 comprises an upper generally annular portion 39 and a lower generally annular portion 40. The cartridge upper portion has a downward projecting and circumferential boss 42 which generally mates with a receiver groove 43 in the lower portion 40 to secure the rupture disc skirt 34 therebetween. A plurality of Allen like screws 45 or the like are circumferentially spaced to pass through the cartridge 6 radially outward from an axis thereof and generally aligned with such axis. The screws 45 are received through apertures 46 in the upper portion 39 and into suitably threaded apertures 47 in the lower portion 40. Heads 48 of the screws 45 urge the cartridge upper portion 39 against the cartridge lower portion 40 when the screws 45 are tightened within the threaded apertures 47 so as to sealably secure the rupture disc 7 between the upper portion 39 and lower portion 40.

The cartridge upper portion 39 has an inner wall surface 51 which faces toward the interior of the vent 2 and the cartridge lower portion 40 has an inner wall surface 52 which also faces inward toward the interior of the vent 2. A radially outward and upward circumferential edge 53 of the upper portion 39 is beveled in such a manner as to be substantially different in configuration from a radially outward and lower beveled edge 54 of the lower portion 40. As is illustrated, the lower edge 54 includes a cut-out 55 suitable for allowing passage of a pin 56 therethrough. The pin 56 is positioned in the receptacle side wall 12 so as to extend therefrom. In this manner, the cartridge 6 can only be inserted into the receptacle 5 in such a manner that the pin 56 can pass through the cut-out 55. This prevents accidental improper positioning of the cartridge 6 within the receptacle 5. In particular, with the type of rupture disc 7 illustrated, the cartridge 6 should be inserted so that the concave side of the rupture disc dome 33 faces the interior of the vent section 21 which in turn communicates with a pressure vessel or the like to be protected by the vent 2. Thus, pressurized fluid would normally come from the lower vent section 21 and exert pressure upon the rupture disc 7 until the rupture disc broke at which time pressure would generally equalize in the vent 2 on both sides of the rupture disc 7.

A handle 58 is also detachably connected to the cartridge upper portion 39 to facilitate manual placement of the cartridge 6 in the receptacle 5 or removal therefrom. Sealing and locking means such as illustrated locking ring 62 is utilized to secure the cartridge 6 within the receptacle 5 when there is pressurized fluid in the lower vent section 21. Such fluid may be a liquid or a vapor. The locking ring 62 is illustrated as a lower locking ring and is associated with a generally similarly shaped socket 63 in the receptacle lower wall 11. There is an upper locking ring 65 having an associated socket 66 similarly situated in the receptacle upper wall 10. The locking rings 62 and 65 are essentially mirror images of one another. Each of the rings 62 and 65 is generally annular in shape and positioned adjacent the interior of the vent 2. The lower ring 62 has a radially inner wall 70, an upper wall 71 with a raised generally trapezoidal shaped surface 72 near a radially outward end thereof, an upper radially outer wall 73 an upper and radially outward bottom wall 74, a lower radially outward wall 75 and a lower and radially inward bottom wall 76 which join to form a generally L-shaped configuration when viewed in cross section except for the raised portion 72. The socket 63 has an upper inner wall 80 generally facing an adjacent the ring wall 73 an upper bottom wall 81 generally opposed to and facing the ring wall 74 with a circumferential recess 82 therein, a lower outer wall 83 generally adjacent and facing the ring wall 75 and a lower bottom wall 84 opposed to and facing the ring bottom wall 76. The socket 63 interior side has no interior wall but rather opens directly into the vent 2.

The cartridge 6 has a bottom surface 90 which is opposed to the ring wall 71 when the cartridge 6 is within the receptacle 5. There is a recess or circumferential seat 91 which mates with the raised portion 72 of the ring 62 when the cartridge 6 is in the receptacle 5. Biasing means, such as a wave spring 93, urge the ring upward so that the raised surface 72 is urged into the seat 91 by the spring 93. The spring 93 is not tightly tensioned so that manual force can easily overcome the pressure exerted against the ring 62 by the spring 93 so that the ring 62 can be pushed downwardly such that the raised portion 72 no longer seats in the seat 91 and such that the cartridge 6 can be fairly easily withdrawn from the receptacle 5 through manual effort. A seal 94 seals between ring wall 75 and socket wall 83. A second seal 95 seals between ring surface 71 and cartridge bottom wall 90 when the cartridge 6 is inserted in the receptacle 5. Both seals 94 and 95 extend outwardly somewhat from the walls or surfaces of the ring 62 in which they are mounted. In this way they compress somewhat when operational so as to provide a tight seal. It is noted that the raised surface or portion 72 urges the remainder of the ring upper surface 71 away from the cartridge bottom wall 90 as the cartridge 6 is being inserted into the receptacle 7 so that the seal 95 does not drag upon the cartridge wall 90 which would otherwise conceivably abrade on and therefore damage the seal 95.

As was previously mentioned, the upper locking ring 65 is essentially the same as the lower locking ring 62 except that the latter is a mirror image of the former. The socket 66 is also a mirror image of the socket 63. The walls of both the locking ring 65 and the socket 66, and such walls are therefore essentially described as was previously described for the locking ring 62 and socket 63 respectively. In addition, the upper ring has associated therewith a spring 96 similar to the spring 93, a seal 97 similar to seal 95 and a seal 98 also similar to seal 94 previously described. When the cartridge 6 is in the receptacle 5, a seat engaging or raised portion 99 of the ring 65 is urged into a mating seat 100 in the upper surface of the cartridge upper portion 39, in a manner similar to that described for the ring 62.

In use, the receptacle 5 is mounted in the vent 2 as illustrated in FIG. 1. The locking rings 62 and 65 are placed in associated sockets 63 and 65 respectively. It is noted that the upper ring is held generally in place by the friction exerted between the seal 98 and the receptacle upper wall 10. The springs 93 and 96 tend to urge the rings 62 and 65 outward from the upper and lower surfaces of the receptacle lower and upper walls 11 and 10 respectively. The rupture disc 7 is placed between the cartridge upper and lower portions 39 and 40 which are then secured together by the screws 45. The tradesman then inserts the cartridge 6 between the receptacle walls 10 and 11 until the beveled edges 53 and 54 engage the rings 65 and 62 respectively. Up to this time there has been no need to compress the springs 93 and 96 associated with the rings 62 and 65 and the cartridge 6 is slid relatively easily into the receptacle 5. It is further noted that the pin 56 prevents the cartridge 6 from being inadvertently installed upside down in the receptacle 5.

Thereafter, the installer pushes against the receptacle which urges the beveled edges 53 and 54 against the rings 65 and 62 respectively, whereby the rings are respectively pushed upward and downward against the springs 96 and 93 so as to compress such springs. This allows the rings 65 and 62 to be pushed further into their respective sockets 66 and 63 so as to present a relatively clean profile to the cartridge 6 which is allowed to slide thereby. Once the cartridge 6 is generally coaxially located within the receptacle 5 and with respect to the vent 2, the springs 96 and 93 respectively urge the rings 65 and 62 into the seats 100 and 91. The cartridge 6 and rupture disc 7 are thereafter in an operative position.

When the vent lower section 21 is pressurized, fluid seaps between the ring surface 76 and socket surface 84 under pressure so as to urge or bias the ring 62 upwardly and lock the ring raised portion 72 within the seat 91 so as to prevent inadvertent removal thereof and so as to urge the seal 95 into snug association with the cartridge lower surface 90. Fluid is prevented from substantially wetting other portions of the ring 62 and further radially out portions of the receptacle 5 and cartridge 6 by the seals 94 and 95. If the vent lower section 21 is overpressurized such that the rupture disc breaks, then the vent upper section becomes pressurized and the upper ring 65 functions in essentially the same way as described for the ring 62 so as to seal between the cartridge 6 and receptacle 5. This also occurs if there is a back pressure within the system even if the rupture disc 2 has not broken so that the cartridge cannot be inadvertently withdrawn from the receptacle 5 when pressure exists on either or both sides of the rupture disc 7.

It is further noted that the socket 63 is in close association with the vent 2 so that if fluid enters the socket 63 and especially between the socket wall 84 and the ring bottom wall 76, for example when the vent fills with liquid, then the fluid is free to drain back into the vent 2 when the liquid level therein recedes. In this way, highly corrosive liquids and/or liquids which would tend to solidify are drained from the socket 63 surrounding the ring 62 so as to ensure that the ring 62 is not hampered in movement, for example, during removal.

In order to remove the cartridge 6 from the receptacle 5 the pressure within the vent must recede to a relatively low pressure so that manual force exerted on the handle 58 will reverse the process discussed above and in particular compress the springs 93 and 96 so that the rings 62 and 65 respectively again present a clean or low profile to the cartridge 6 and so that the latter may be removed from the receptacle 5. If the disc 7 is broken, the cartridge 6 is disassembled and the rupture disc 7 replaced after which the same cartridge 6 or alternatively, a duplicate cartridge, is replaced into the receptacle 5 as discussed above.

FIG. 6 is directed to a modified embodiment of a rupture disc arrangement according to the present invention generally designated by the reference numeral 101. The rupture disc arrangement 101 comprises a receptacle 104, a cartridge 105 and a rupture disc 106 held by the cartridge 5. The arrangement 101 is essentially the same as the arrangement 1 except that a retaining ring 108 is positioned within a socket 109 in the cartridge 105 while a raised portion or seat engaging surface 110 on the ring 108 is received within a seat 111 in the receptacle 104. This configuration is the opposite as was seen in the arrangement 1. The only other major difference between the arrangement 101 and the arrangement 1 is that a guide peg 115 is positioned in a lower wall 116 of the receptacle 104 rather than in a side wall as in arrangement 1.

In operation, the arrangement 101 is essentially the same as the operation of the arrangement 1 with the exception that upon withdrawal of the cartridge 105, the upper ring 108 is withdrawn with the cartridge 105 rather than remaining with the receptacle 104 as in the previous embodiment.

It is foreseen that both the lower and upper locking rings could be positioned in sockets within the cartridge such as is done for the upper locking ring 108 of the modified embodiment of FIG. 6.

It is to be understood that while certain forms of the present invention have been illustrated and described herein, it is not to be limited to the specific forms or arrangement of parts described and shown.

What is claimed and desired to be secured by Letters Patent is as follows:

1. In a replaceable rupture disc cartridge arrangement wherein a cartridge is removably insertable into a fixed receptacle within a vent such that a rupture disc held by the cartridge is operably positioned so as to block passage of fluid through the vent until the disc is broken by overpressure of the fluid within the vent; the arrangement including the cartridge, the receptacle and sealing means for prevention of flow of fluid between the receptacle and the cartridge when the cartridge is operably positioned relative to the vent and further including locking means for substantially securing the cartridge within the receptacle when fluid is pressurized within the vent; the improvement comprising wherein:

(a) said locking means comprises an annular ring circumscribing and positioned adjacent to the vent in a first of said cartridge or said receptacle; said ring having a seat engaging surface on one side thereof, a fluid engaging surface on an opposite side thereof and a channel passing therethrough;

(i) said channel being coaxial with the vent and being defined by an inner cylinder sidewall; said cylindrical sidewall forming a portion of the vent whenever said cartridge arrangement is inserted within said vent; and said cylindrical sidewall having a diameter substantially equivalent to said vent;
(b) a socket positioned in said first of said cartridge or said receptacle and having a general configuration similar to said ring; said socket slidably receiving said ring;
(c) a recessed seat in a second of said cartridge or said receptacle and aligned to generally mate with the seat engaging surface of said ring when the cartridge is in the operational configuration thereof;
(d) biasing means positioned between a biasing means engaging surface of said ring, opposite said seat engaging surface thereof, and said socket, so as to urge said seat engaging surface of said ring into said seat when said cartridge is in the operational configuration thereof; and including
(e) a sealing mechanism positioned between said biasing means and said vent such that fluid from said vent is substantially prevented from wetting said biasing means;
(f) whereby, when said cartridge is in operational configuration thereof and fluid pressure exists within the vent, fluid exerts a force against said fluid receiving surface of the ring so as to bias said seat engaging surface of said ring into said seat, thereby substantially locking said cartridge within said receptacle.

2. The arrangement according to claim 1 wherein:
(a) said socket is open on radially inward side thereof to said vent; and
(b) said sealing mechanism is positioned between said socket and said ring to prevent any fluid retention in a portion of said assembly between said socket and said ring and in communication with the vent;
(c) whereby liquid entering said socket when said vent fills with liquid is free to drain from said socket when liquid recedes from the vent.

3. The arrangement according to claim 2 wherein:
(a) said cartridge comprises an upper annular portion and a lower annular portion securely held together by fastening means;
(i) said rupture disc being positioned between said upper annular portion and said lower annular portion;
(ii) said cartridge being removable from said receptacle by a force, aligned substantially perpendicular to an axis of the vent, being applied directly to said upper annular portion or said lower annular portion.

4. A rupture disc arrangement for positioning a rupture disc in a vent to prevent flow of fluid through the vent until the rupture disc is broken; said arrangement comprising:
(a) a receptacle having first and second opposite and generally equally spaced walls; said walls being substantially fixed in position relative to one another by spacing means;
(b) a cartridge having the rupture disc therein; the cartridge being slidably and removably received in said receptacle to be positioned in an operational configuration thereof wherein the rupture disc is aligned to prevent flow of fluid through the vent when the disc is unbroken; said cartridge being snugly received in said receptacle between said spaced walls thereof;
(i) said cartridge comprising an upper annular portion and a lower annular portion; said rupture disc being positioned between said upper annular portion and said lower annular portion; and said cartridge being removable from said receptacle by a force, aligned substantially perpendicular to an axis of said vent, being applied directly to said upper annular portion or said lower annular portion;
(c) a first locking ring received in one of a first side of said cartridge or said first receptacle wall;
(d) a second locking ring received on one of a second side of said cartridge or said second receptacle wall;
(e) each of said rings being generally annular and being positioned so as to be generally adjacent and circumscribing said vent when said cartridge is in the operational configuration thereof; each of said rings having a first seating surface, an opposite fluid engaging surface and a channel passing therethrough;
(i) said channel being coaxial with said vent and being defined by an inner cylindrical sidewall; said cylindrical sidewall forming a portion of the vent whenever said cartridge arrangment is inserted within said vent; and, said cylindrical sidewall having a diameter substantially equivalent to said vent;
(f) a first socket in the cartridge or first receptacle wall associated with said first ring slidably receiving said first ring and being similar in configuration thereto;
(g) a second socket in the one of said cartridge or said second receptacle wall associated with said second ring, slidably receiving said second ring, and being similar in configuration thereto;
(i) each of said sockets being open on a radially inward side thereof to said vent;
(h) a first recessed seat in the one of said cartridge or said first receptacle wall not associated with said first ring; said first seat being positioned to receive said first ring seat engaging surface when said cartridge is in the operational configuration thereof;
(i) a second recessed seat in the one of said cartridge or said second receptacle wall not associated with said second ring; said second seat being positioned to receive said second ring seat engaging surface when said cartridge is in the operational configuration thereof;
(j) biasing means positioned between a biasing means engaging surface of each of said rings, opposite said seat engaging surface thereof, and said associated socket, so as to urge each of said seat engaging surfaces of said rings into said seats when said cartridge is in the operational configuration thereof;
(k) a sealing mechansim positioned between said biasing means and said vent such that fluid from said vent is substantially prevented from wetting said biasing means;
(i) said sealing mechanism being positioned between each of said sockets and said rings to prevent any fluid retention in a portion of said assembly between said sockets and said rings and in communication with said vent; whereby liquid entering said sockets, when said vent fills with liquid, is free to drain from said sockets when liquid recedes from said vent; and (l) whereby, when said cartridge is in the operational configuration thereof, and fluid pressure exists within said vent, fluid exerts a force against said fluid engaging surfaces of said rings so as to bias said seat engaging surfaces of each of said rings into said seats, thereby substantially locking said cartridge within said receptacle until the fluid pressure within said vent recedes to near atmospheric pressure.

5. The arrangement according to claim 4 wherein:
(a) said first socket is in said first receptacle wall;
(b) said second socket is in said second receptacle wall;
(c) said vent is substantially vertical; and
(d) each of said rings includes a mounting mechanism retaining said rings within said sockets, and in annular relationship to said vent, whenever said cartridge is removed from said receptacle.

6. The arrangement according to claim 4 wherein:
(a) said mounting mechanism comprises an O-ring circumscribing each of said rings on a socket engaging surface thereof.

* * * * *